T. DAVIS.
OVEN.
APPLICATION FILED FEB. 5, 1919.
1,330,849.
Patented Feb. 17, 1920.
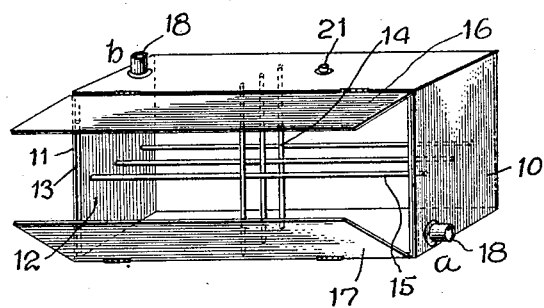
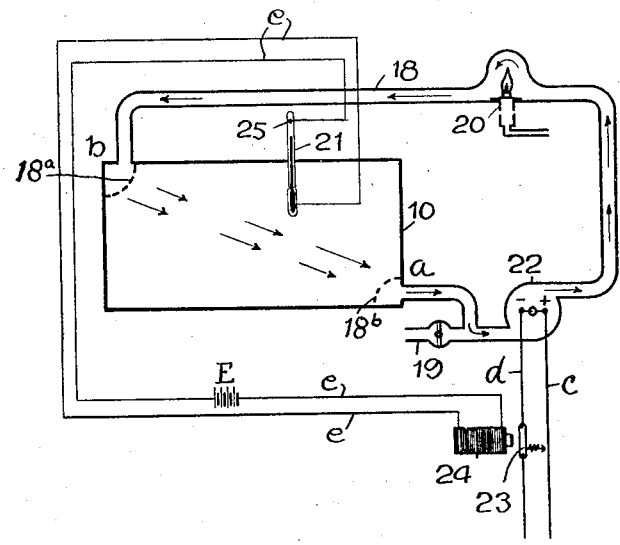
Theron Davis, Inventor,
By his Attorney
W. P. Hutchinson.

UNITED STATES PATENT OFFICE.

THERON DAVIS, OF NEW YORK, N. Y.

OVEN.

1,330,849.      Specification of Letters Patent.      Patented Feb. 17, 1920.

Application filed February 5, 1919. Serial No. 275,063.

*To all whom it may concern:*

Be it known that I, THERON DAVIS, a citizen of the United States, and a resident of the city, county, and State of New York, have invented a new and useful Improvement in Ovens, of which the following is a full, clear, and exact description.

My invention relates to improvements in ovens, and more particularly to ovens in which a substantially constant and not very high temperature is desirable, such for instance as ovens which are used for vulcanizing rubber goods, which is an important use of my oven, though it can also be used for baking and drying purposes generally. The object of my invention is to produce a very simple oven of this kind having a thermostatic control, and in which the source of heat may be somewhat removed from the oven, and a forced current of air is carried over a heating medium into the oven and then circulated back and over the heating medium, a constant circulation of hot air being thus preserved. In connection with this I use a thermometer or other form of thermostat which when the temperature rises above a certain point will cut off the blower and stop the circulation of the heated air, and which on the other hand when the temperature falls below the desired point will again start the fan and promote circulation. In this way a very simple oven can be made, and very simple means of heating and preserving a constant temperature. In carrying out the invention I prefer to have the walls insulated against too rapid loss of heat, and I also prefer to have the oven provided with a series of compartments so that various articles can be conveniently placed in or removed from it. For vulcanizing purposes I divide it into a series of chambers so that a corresponding series of molds containing the articles to be vulcanized can be readily inserted or removed. Obviously the detail structure and form of the oven is not very material, and the important points of the invention will appear more clearly from the description which follows:

Reference is to be had to the accompanying drawings forming a part of this specification, in which similar reference characters indicate corresponding parts in all the views.

Figure 1 is a perspective view of the oven with the doors partially open, and

Fig. 2 is a diagrammatic view of the oven, its means for circulating air, and electrical means for stopping and starting the air circulation.

The oven 10 is shown by way of example rather than to define the details of the invention, and is preferably of generally rectangular shape, and is also preferably provided with an outer wall 11, an inner wall 12, and an intervening layer 13 of asbestos or other poor heat conductor, although the walls can be made in any convenient way which will prevent a too rapid loss of heat. Internally the oven can be divided into compartments if desired, and there can be any necessary number of these. I have shown a vertical central partition 14 and a central horizontal partition 15, each being in the form of rods spaced apart so that all parts of the oven will be of substantially the same temperature, and four compartments are thus made, but obviously the number of partitions can be increased, their structure changed, or the arrangement made different from that shown without affecting the invention in any way. The oven is provided with suitable doors, and as illustrated I have shown swinging doors 16 and 17 hinged at the upper and lower parts of the oven respectively.

The oven is provided with a pipe line 18 for the circulation of air, which connects preferably with the oven at one end and near the bottom as shown at $a$, and at the opposite end and near the top as shown at $b$. Opposite the inlet and outlet of the oven perforated screens 18$^a$ and 18$^b$ are preferably arranged so as to cause the air in the oven to spread and fill and circulate through all parts of the oven. This air pipe line can be extended for any convenient distance. and it has a valve controlled inlet 19 to the atmosphere. The air is made to pass over the heating means 20 which can be a Bunsen burner, an alcohol lamp, or any suitable heating means, the character of the heater depending largely on the use of the oven and the amount of heat required. The pipe line is also provided with a fan 22 of any approved kind, which circulates the air rapidly causing it to enter at $b$ and be withdrawn at $a$, as indicated in the diagrammatic view, though of course the circulation might be in the opposite direction if desired.

For a thermostatic control I have shown a thermometer 21 extending through the top wall of the oven, and the fan 22 referred to is electrically driven, the fan motor being in line with the circuit wires $c$ and $d$ which include a switch 23 placed opposite an electro-magnet 24. The magnet is in an independent circuit being connected with a source of electric supply E, and a wire e leads from one pole of the battery through the magnet and to the mercury of the thermometer 21, while the other wire leads from a contact 25 above the normal mercury level of the thermometer and at a height corresponding to the desired temperature, so that when this temperature in the oven is reached the expansion of the mercury will close the circuit through the contact 25.

It will be noticed that under normal circumstances the electrically driven fan 22 will rotate and perform its function of circulating the air through the pipe line and through the oven, the air as it cools being reheated by the burner or heater 20. When, however, the temperature rises to the desired limit, the circuit will be closed by the rise of mercury in the thermometer 21 so as to close the circuit through the wires e, thus energizing the magnet 24 which will open the switch 23 thereby breaking the fan circuit and stopping the air circulation.

It will thus be seen that by a very simple arrangement I can have the oven located at a desired point and the heating means also at a desired point, that a constant circulation of air can be maintained, and that the arrangement for maintaining a constant temperature of the oven is of great simplicity.

I have shown the means for controlling the circulation of air and the temperature of the oven by way of example merely, as it will be obvious that various forms of thermostats can be used, and that various means controlled by a thermostat can likewise be used for controlling the air circulation or for stopping and starting the fan, without affecting this invention.

It is desirable, however, that the oven be provided with a plurality of compartments so that articles can be placed in it at different times and withdrawn when desired so that work can be carried on to the best advantage. It will be readily seen that while the oven as designed is particularly adapted to vulcanizing various articles, it can be used for a great many purposes, such as baking, heating and drying.

In the specification and drawings I have described and illustrated a means of controlling the temperature of the oven and keeping it substantially constant by regulating the flow of air through the pipe line, but it will be obvious to any mechanic that this might be done by manipulating the valve of the inlet pipe 19 so as to permit a greater or less flow of cool air to the pipe line, and it will also be apparent that instead of controlling the flow of air or the amount of atmospheric air, the same effect will be had by having the thermostat control the heating medium so as to increase or diminish the amount of heat generated. Thermostatic devices of this sort are so common in connection with heating furnaces and the like that it is not thought necessary to illustrate it, but my invention lies broadly in the oven having a pipe line for circulating air through the oven and pipe line, and means governed by the action of the thermostat in the oven for controlling the temperature and circulation of air which is passing through the pipe line and oven.

I claim:—

1. A structure of the kind referred to comprising an oven, an air pipe line connected with the oven, a heater for heating the air in the pipe line, means for forcing a circulation of air through the pipe line and oven, and a thermostat on the oven operatively connected to stop and start the air circulating means.

2. An oven, a pipe line connected with different parts of the oven, means for heating the air in the pipe line, means for maintaining a circulation of air through the pipe line and oven, and automatic means controlled by the oven temperature for regulating the air circulation.

3. An oven, an endless line of air pipe connecting with the oven at different points, means for heating the air in the pipe line, a fan for circulating the air, a thermostat connected with the oven, an electric circuit opened and closed by the thermostat, and electrically operated means in said circuit for stopping and starting the fan.

4. An oven, an endless line of air pipe connected with different parts of the oven, a heater spaced apart from the oven and arranged to heat the air in the pipe line, a fan to circulate the air of the pipe line and oven, and means controlled by the rise and fall of temperature in the oven to stop and start the fan.

5. An oven, an endless line of air pipe connecting with the oven at different points, a heater applied directly to the pipe line to heat the air therein, means for regulating the supply of air to the pipe line, means for forcing the circulation of air through the pipe line and oven, and means controlled by the change of temperature in the oven to stop and start the air circulating means.

6. An oven, an endless pipe line connecting with the oven at different points, a heater applied directly to the pipe line, means for circulating the air in the pipe line and oven, a thermostat connected with the oven, and means controlled by the thermostat for regulating the temperature of the air which passes through the pipe line.

THERON DAVIS.

Witnesses:
WARREN B. HUTCHINSON,
M. G. O'DONNELL.